(12) United States Patent
Searby

(10) Patent No.: US 6,726,295 B2
(45) Date of Patent: Apr. 27, 2004

(54) CONFIGURABLE COMPUTER ENCLOSURE

(75) Inventor: Tom J Searby, Ft. Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/464,384

(22) Filed: Jun. 17, 2003

(65) Prior Publication Data

US 2003/0214204 A1 Nov. 20, 2003

Related U.S. Application Data

(63) Continuation of application No. 09/903,085, filed on Jul. 10, 2001, now Pat. No. 6,616,251.

(51) Int. Cl.⁷ .............................................. A47B 97/00
(52) U.S. Cl. .................................. 312/223.2; 361/683
(58) Field of Search ................... 312/244, 265.1–265.6, 312/223.1, 223.2, 263; 361/683; 220/4.21, 4.22, 4.24, 4.02, 4.28–4.29, 628, 630, 638, 668, 669, 675

(56) References Cited

U.S. PATENT DOCUMENTS

| | | | |
|---|---|---|---|
| 4,356,531 A | * | 10/1982 | Marino et al. ........... 312/265.5 |
| 4,652,969 A | * | 3/1987 | Stegenga ................. 220/4.24 |
| 4,690,286 A | * | 9/1987 | Horne et al. ............... 211/26 |
| 5,248,193 A | * | 9/1993 | Schlemmer ............... 248/615 |
| 5,369,549 A | * | 11/1994 | Kopp et al. ............... 220/324 |
| 5,417,012 A | * | 5/1995 | Brightman et al. ...... 312/223.2 |
| 5,450,285 A | * | 9/1995 | Schlemmer ............... 248/615 |
| 5,593,219 A | * | 1/1997 | Ho ........................... 220/4.02 |
| 5,808,871 A | * | 9/1998 | Rosecan et al. ........... 174/52.1 |
| 5,831,822 A | * | 11/1998 | Hulick et al. .............. 361/687 |
| 5,890,783 A | * | 4/1999 | Babcock et al. ......... 312/223.2 |
| 5,931,550 A | * | 8/1999 | Chen ....................... 312/223.2 |
| 5,944,398 A | * | 8/1999 | Wu .......................... 312/223.2 |
| 5,947,570 A | * | 9/1999 | Anderson et al. ............. 211/26 |
| 5,975,659 A | * | 11/1999 | Yang et al. .............. 312/223.2 |
| 6,015,195 A | * | 1/2000 | Anderson et al. ........... 312/216 |
| 6,027,191 A | * | 2/2000 | Korinsky et al. ........ 312/223.2 |
| 6,059,384 A | * | 5/2000 | Ho ........................ 248/346.04 |
| 6,382,744 B1 | * | 5/2002 | Xiao ...................... 312/223.2 |

* cited by examiner

Primary Examiner—Jennifer E. Novosad
(74) Attorney, Agent, or Firm—Kevin M. Hart

(57) ABSTRACT

A configurable enclosure covers a computer for use in an office setting and can be removed for use of the computer in a rack-mount setting. The enclosure may be constructed using one identical panel in two places. The two panels releasably engage opposite sides of the computer to form a shell assembly. The shell may be taller and wider than the computer to establish air cavities that are in fluid communication with ambient air for cooling purposes. The panels are releasably attached by hooks that engage holes on the computer. Resilient catches secure the panels once the hooks are engaged. The assembly may be placed on its side in a pedestal. Tabs on the back and protrusions on the sides of the assembly secure it in the pedestal. An access panel of the computer may be removed while leaving the panels of the shell assembly attached.

6 Claims, 7 Drawing Sheets

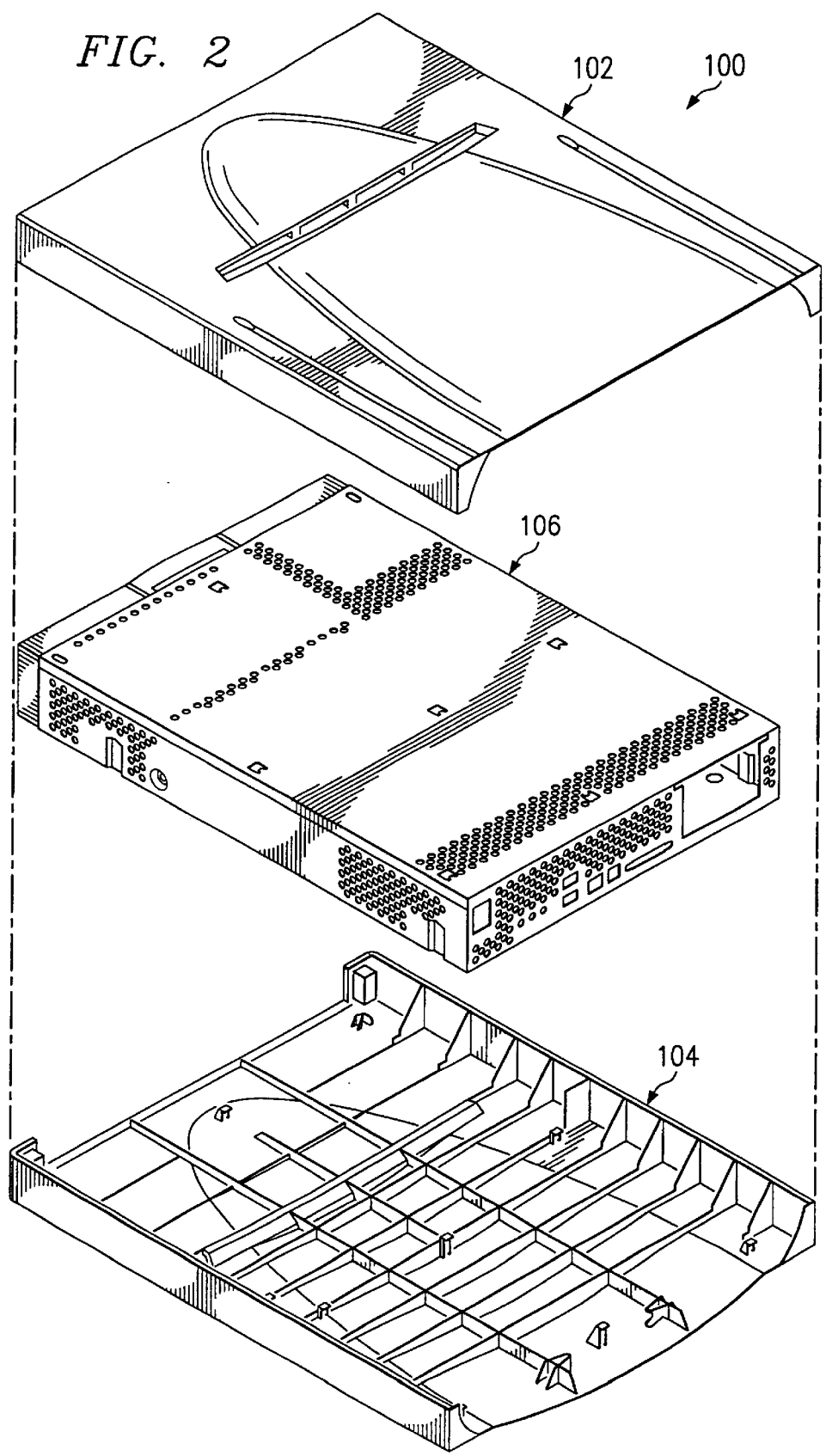

CONFIGURABLE COMPUTER ENCLOSURE

CROSS REFERENCE TO RELATED APPLICATION

This is a continuation of application Ser. No. 09/903,085 filed on Jul. 10, 2001, now issued as Pat. No. 6,616,251 B2, which is hereby incorporated by reference herein.

FIELD OF THE INVENTION

This invention relates to computer enclosures.

BACKGROUND

Computers used in a rack-mount setting have traditionally had an industrial look that is not well suited for an office environment. One reason for the difference in appearance between rack-mount and office computers is that cooling considerations are often more important in the rack-mount setting because of the close proximity of the computers in the rack. In the office setting, computers are typically not located so closely together, and other considerations such as noise and aesthetics apply. Numerous solutions have been proposed to enclose a rack-mount computer so that it could be used in an office-type setting, but such solutions have typically resulted in high cost and difficulty in accessing the internal components of the computer.

SUMMARY OF THE INVENTION

In one aspect, the invention includes a configurable computer enclosure that can be used to cover a computer for use in an office setting, or that can be removed from the computer for use in a rack-mount setting. A configurable enclosure according to the invention may be constructing using one identical panel in two different places. The two identical panels may releasably engage opposite sides of the computer to form a shell assembly that encloses the computer.

In another aspect, two panels may be designed so that air flow passages to and from the inside of the computer are maintained even when the panels are attached to the computer. A shell assembly formed by the panels may be substantially taller and wider than the computer itself, thus establishing air cavities between the enclosure panels and the surfaces of the computer. Air may pass through these cavities and enter or exit the shell assembly from the front or back for cooling purposes.

In another aspect, the panels may be releasably attached to the computer by means of hooks on the panels that engage corresponding holes on the computer. A resilient catch may be used to secure the panel to the enclosure once the hooks are engaged with the holes.

In another aspect, the shell assembly may be placed on its side into a pedestal for use in an office setting. Tabs on the back of the enclosure panels and protrusions on the sides of the panels may be used to secure the shell assembly into the pedestal.

In another aspect, the internal components of the computer may be accessed for service without removing either of the enclosure panels from the computer. Rather, the enclosure panels may remain attached to the computer while an access panel of the computer itself is removed.

BRIEF DESCRIPTION OF THE DRAWINGS

FIGS. 1 and 2 are exploded front and rear oblique views of a computer and two enclosure panels according to a preferred embodiment of the invention.

DETAILED DESCRIPTION OF THE PREFERRED EMBODIMENTS

Figure 1:
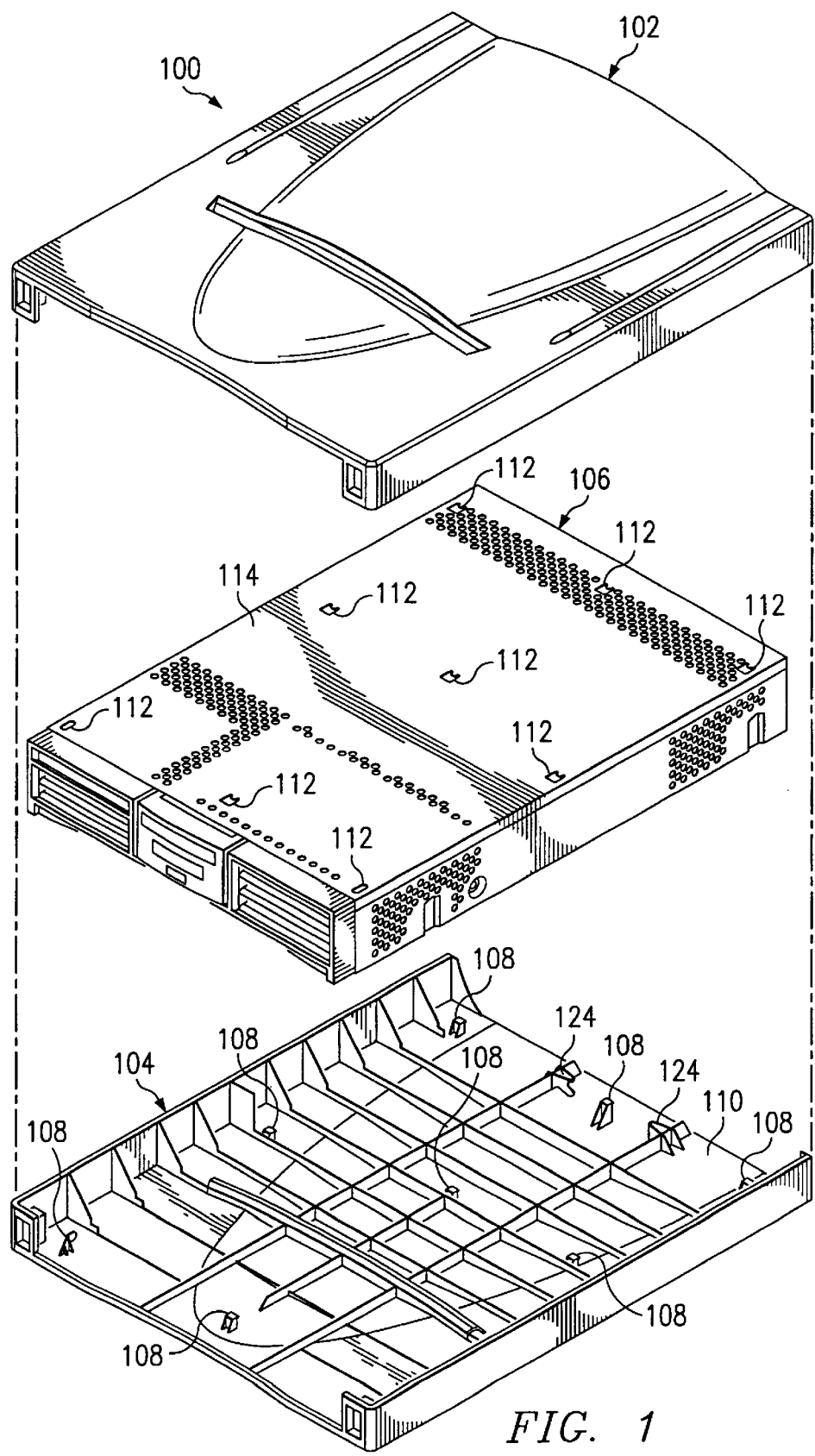
Figure 4:
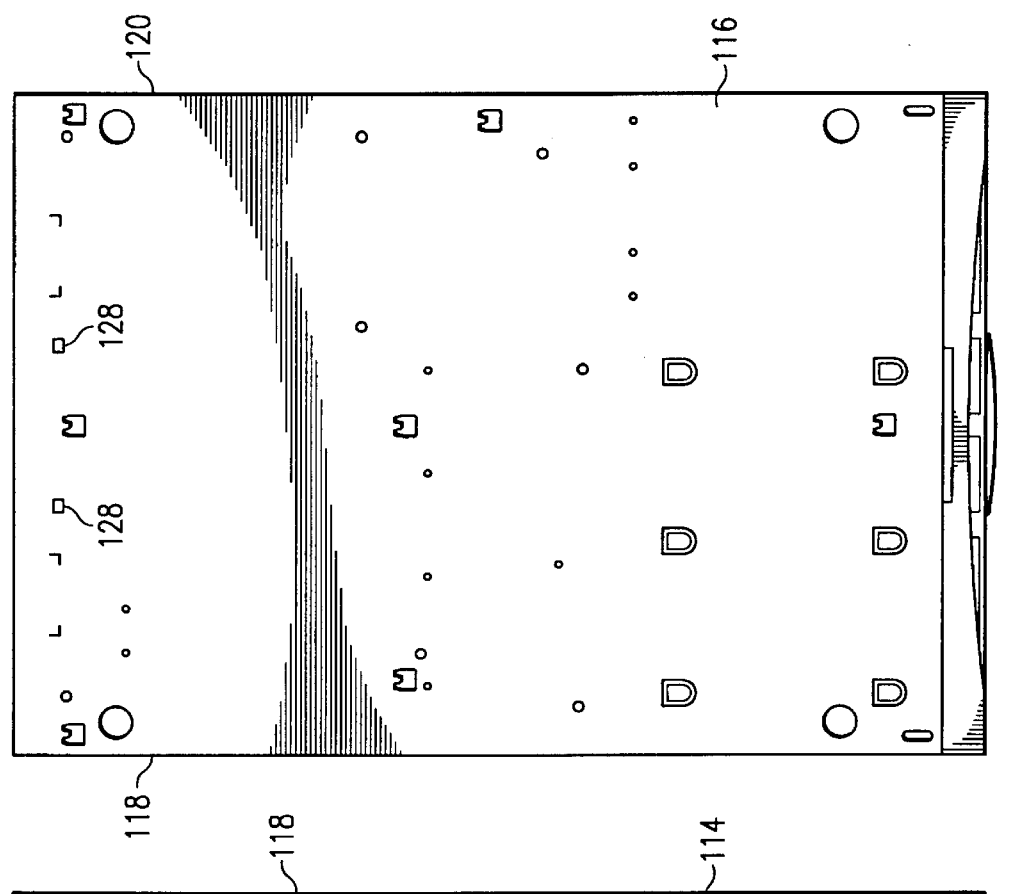
FIGS. 3 and 4 are top and bottom orthogonal views of the computer of FIGS. 1 and 2.
Figure 3:
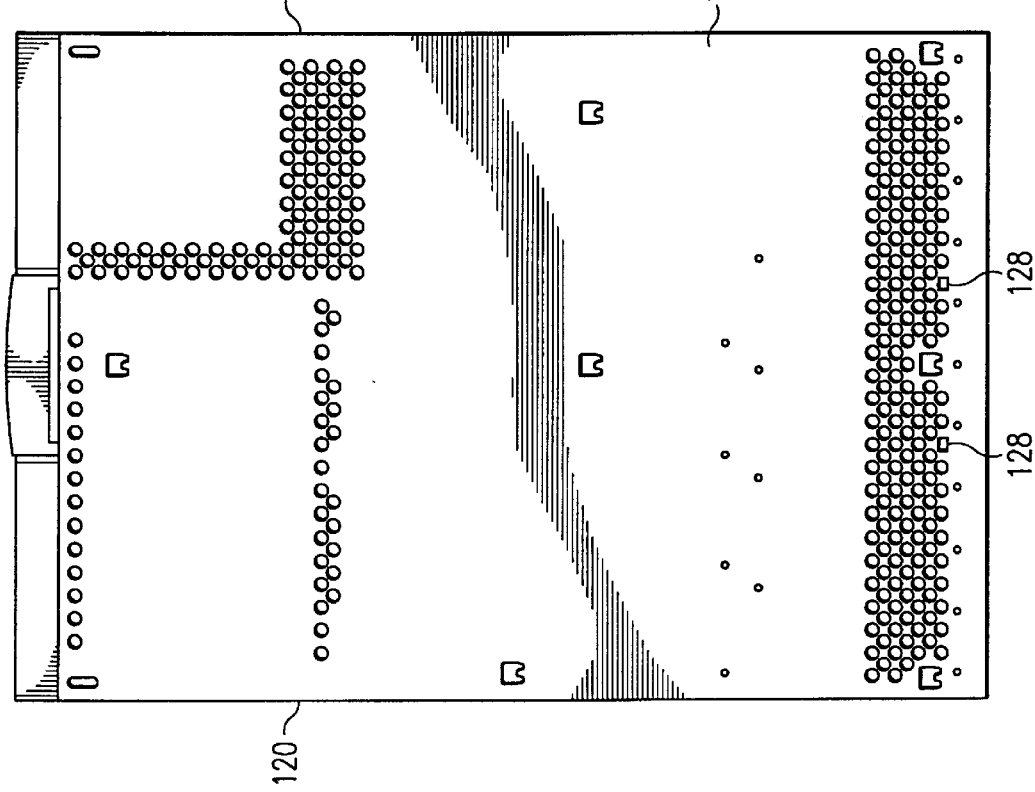
Figure 5:
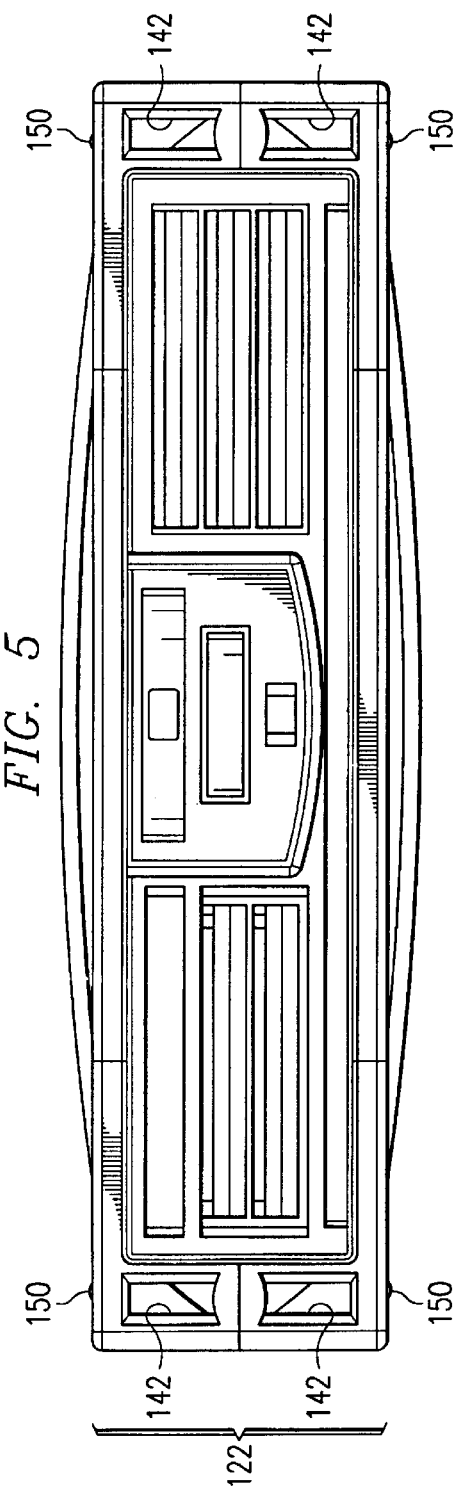
FIGS. 5 and 6 are assembled front and back orthogonal views of the computer and enclosure panels of FIGS. 1 and 2.

Referring now to FIGS. 1–6, a configurable computer enclosure 100 according to an embodiment of the invention may include a first enclosure panel 102 and a second enclosure panel 104, both adapted to engage an outside surface of a computer 106. One method of adapting the panels to engage the computer surfaces is to use hooks and holes as in the illustrated embodiment. For example, numerous hooks 108 may be provided on an inside surface 110 of each panel 102, 104, and a corresponding number of holes 112 may be provided on a top surface 114 and a bottom surface 116 of computer 106. Panels 102, 104 may be moved orthogonally toward surfaces 114, 116 until hooks 108 enter holes 112. Then, panels 102, 104 may be moved in a direction parallel with surfaces 114, 116 until each of hooks 108 engages underneath one side of its corresponding hole 112. When the panels are so engaged with surfaces 114, 116, the panels contact each other along seams 126 adjacent left and right sides 118, 120 of computer 106, forming a shell assembly 122. Shell assembly 122 substantially covers the top, bottom, left and right surfaces 114, 116, 118, 120 of computer 106.

To further secure panels 102, 104 to computer 106, each panel may be equipped with one or more resilient catches 124. Each catch 124 engages a corresponding catch surface on a surface of computer 106. In the illustrated embodiment, the catch surfaces on computer 106 take the form of holes 128. The illustrated resilient catches 124 may be integrally molded with panels 102, 104 using plastic. Preferably, the catches are biased away from inside surface 110 of the panel so that they engage holes 128 automatically when the corresponding catch 124 and hole 128 are brought into alignment. When catches 124 are so engaged, they prevent panels 102, 104 from moving in a direction parallel with surfaces 114, 116 of computer 106. The engagement of hooks 108 underneath holes 112 prevents panels 102, 104 from moving orthogonally away from surfaces 114, 116. Thus, when hooks 108 and catches 124 are engaged, panels 102, 104 are securely attached to surfaces 114, 116.

Each catch 124 may also be equipped with a rim 130 that can be depressed with the force of a finger, in the direction of inside surface 110, in order to disengage the catches 124 from holes 128 so that panels 102, 104 can be removed from computer 106. Rims 130 may be located near the front or the back end of shell assembly 122 so that they are easily accessible by hand. Four such rims are visible in FIG. 6, which is a view into the back end of the shell assembly 122 of one embodiment.

Figure 6:
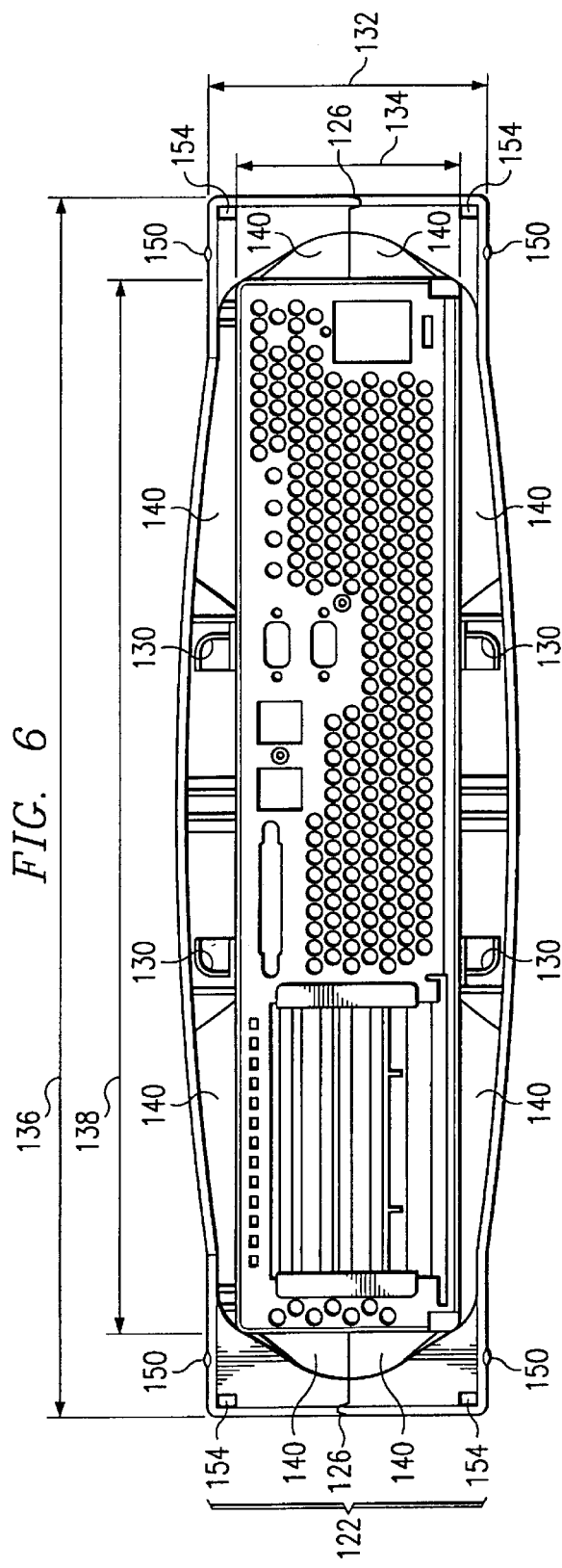
Figure 8:
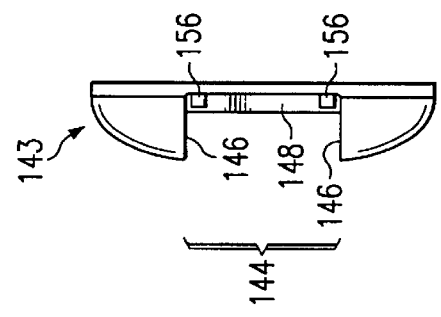
FIGS. 7 and 8 are top and side orthogonal views of a pedestal suitable for use with the computer and enclosure panels of FIGS. 1 and 2 according to a preferred embodiment of the invention.
Figure 7:
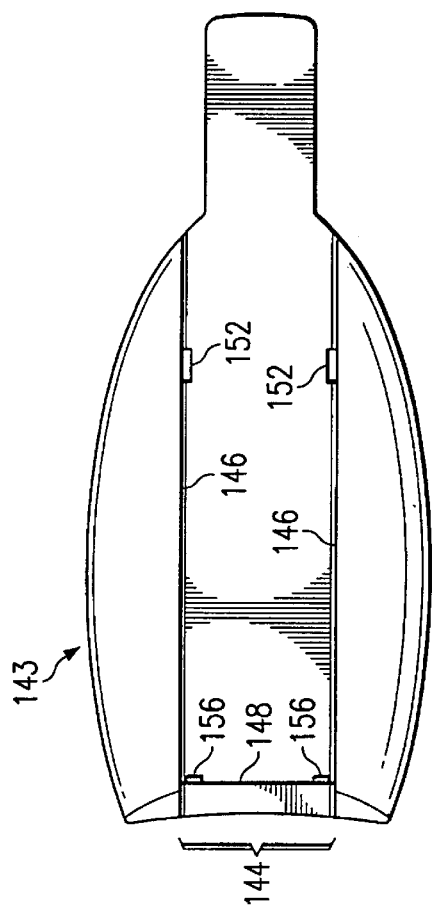
Figure 9:
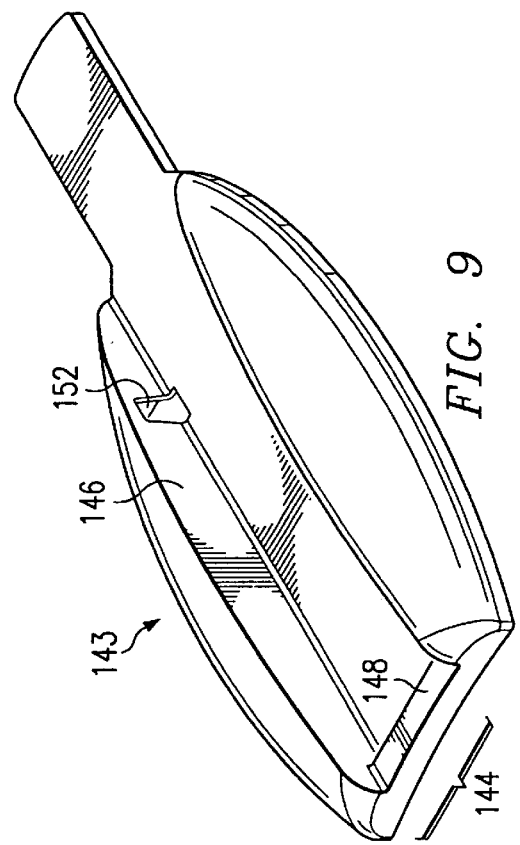
FIG. 9 is an oblique view of the pedestal of FIGS. 7 and 8.

In FIG. 6, it can be seen that the height 132 of shell assembly 122 is greater than the height 134 of computer 106. In addition, the width 136 of shell assembly 122 is greater than the width 138 of computer 106. Thus, air cavities 140 are established between the top, bottom, left and right outside surfaces of computer 106 and the corresponding inside surfaces of shell assembly 122. These air cavities are in fluid communication with ambient air on at least one end of shell assembly 122. In the illustrated embodiment, they are in fluid communication with ambient air on both ends, as indicated in drawings at 140 (back end) and 142 (front end). The air cavities and the front and back openings allow computer 106 to cool itself during operation when shell assembly 122 is attached.

Referring now to FIGS. 7–11, a pedestal 143 may be provided to hold shell assembly 122 and computer 106 on their side when computer 106 is to be used, for example, beside a desk. To help retain shell assembly 122 within pedestal 143, a channel 144 may be provided within pedestal 143 having left and right upright surfaces 146 and a back upright surface 148. Shell assembly 122 may be provided with at least one protrusion 150 for engaging a recess 152 formed in upright surfaces 146. In addition, at least one tab 154 may be provided on one end of shell assembly 122 for engaging a recess 156 formed in upright surface 148. In the illustrated embodiment, two recesses 152 are provided, one on each of left and right upright surfaces 146; and two recesses 156 are provided, one on either end of back upright surface 148. Four protrusions 150 are provided, two on each of panels 102, 104; and four tabs 154 are provided, two on each of panels 102, 104. With this configuration, shell assembly 122 may be mounted in pedestal 143 on either its left or right side.

Figure 10:
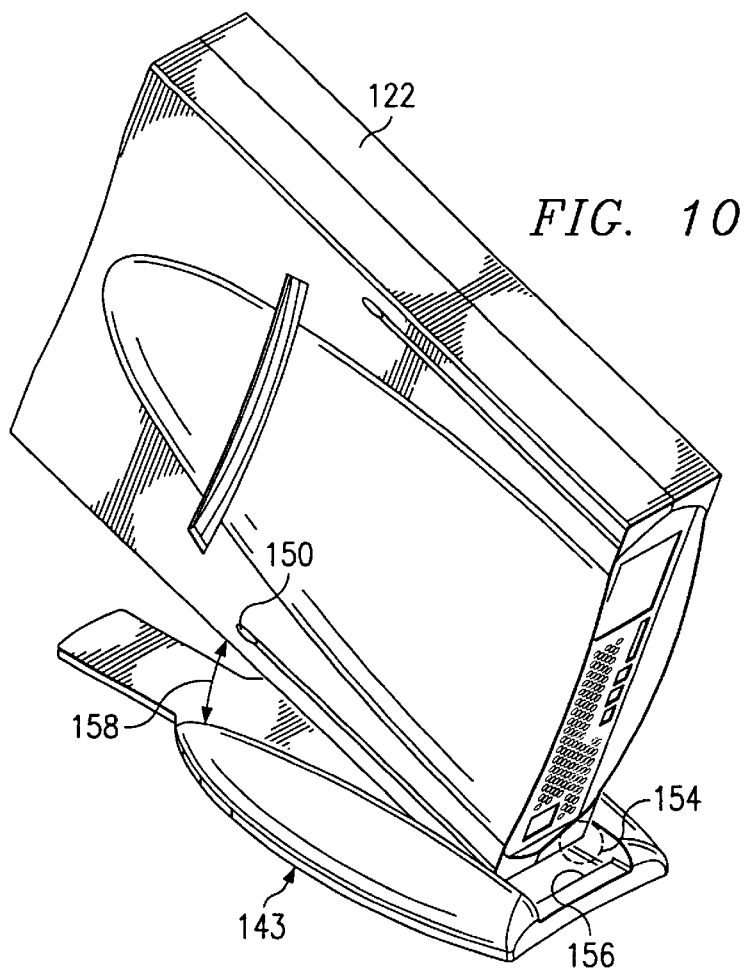
FIG. 10 is an oblique view illustrating a preferred method for installing the computer and enclosure panels of FIGS. 1 and 2 into the pedestal of FIGS. 7, 8 and 9.
Figure 11:
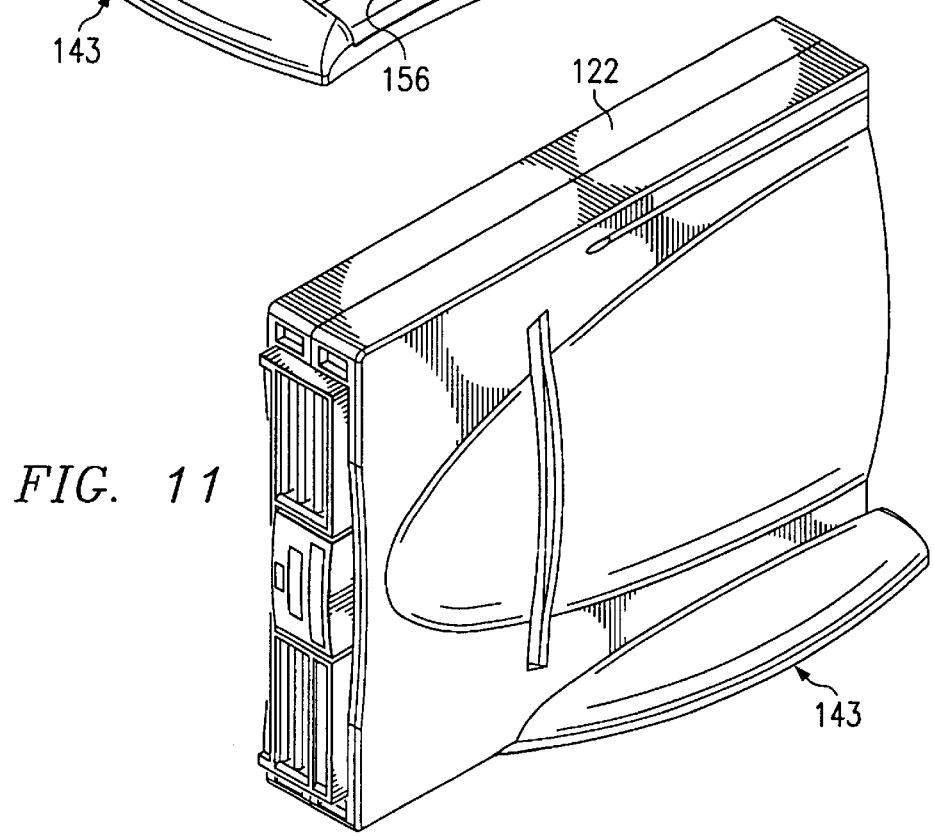
FIG. 11 is an oblique view illustrating the computer and enclosure panels of FIGS. 1 and 2 having been installed into the pedestal of FIGS. 7, 8 and 9.
Figure 12:
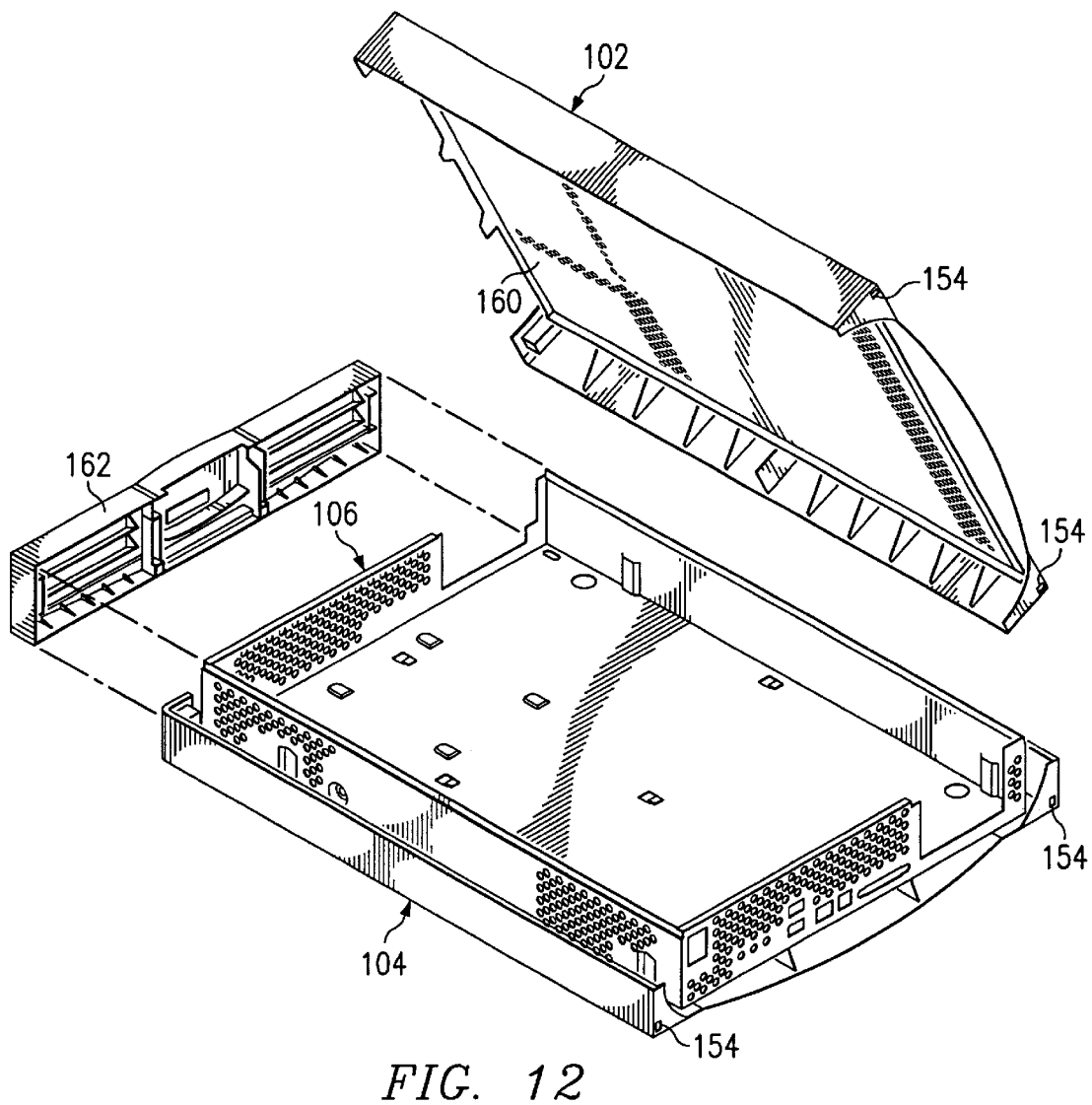
FIG. 12 is an exploded oblique view of the computer and enclosure panels of FIGS. 1 and 2 illustrating a preferred method for accessing internal components of the computer.

FIGS. 10–11 illustrate a convenient way to mount shell assembly 122 into pedestal 143: Tabs 154 may be aligned with recesses 156 and shell assembly placed against back upright surface 148 as indicated at 156. Then, shell assembly 122 may be pivoted down into channel 144 as indicated at 158 until protrusions 150 snap into recesses 152 so that shell assembly 122 is retained in pedestal 143 as shown in FIG. 11. Pedestal 143 may be made of molded plastic so that upright surfaces 146 are somewhat compliant, facilitating the engagement and disengagement of protrusions 150 and recesses 152. To remove shell assembly 122 from pedestal 143, the process may simply be reversed.

When computer 106 is to be used in an office setting, panels 102, 104 may be attached to it as described above, and shell assembly 122 may be placed into pedestal 143. But when computer 106 is to be used in a rack-mount setting where cooling is more difficult and aesthetics are less important, it may be removed from pedestal 143 and shell assembly 122 may be removed.

If internal components of computer 106 must be accessed while shell assembly 122 is installed, access panel 160 of computer 106 may be removed while enclosure panels 102, 104 are left in place. To facilitate removal of access panel 160, a bezel 162 may be snapped off of computer 106 from one end to reveal fasteners that correspond to access panel 160. Bezel 162 may be snapped on and off of computer 106 while shell assembly 122 is in place because the front end of shell assembly 122 provides a clearance hole for bezel 162.

What is claimed is:

1. A configurable system computer comprising:

a computer comprising a top surface a bottom surface a left surface and a right surface, the top, bottom, left and right surfaces together at least partially defining an outside surface of the computer, the outside surface comprising a plurality of holes:

first and second enclosure panels, each having a plurality of hooks on an inside surface thereof for engaging the plurality of holes in the outside surface of the computer; and wherein, when the first and second enclosure panels are placed adjacent the top and the bottom surfaces of the computer and the hooks are engaged with the holes, the first and second enclosure panels contact one another along left and right surfaces of the computer to form a shell assembly that substantially covers the top, bottom, left and right surfaces of the computer.

2. The system computer enclosure of claim 1, wherein:

each of the first and second enclosure panels further comprises a resilient catch for releasably engaging a corresponding catch surface on the computer to retain the panels on the computer once the hooks have been engaged with the holes.

3. The system of claim 2, wherein:

the first enclosure panel catch and the second enclosure panel catch are accessible from at least one end of the shell assembly so that the catches are capable of being disengaged from the catch surfaces manually.

4. The system of claim 1, wherein: the first and second enclosure panels are identical to one another.

5. A configurable system, comprising:

a computer comprising a top surface, a bottom surface, a left surface and a right surface, the top, bottom, left and right surfaces together at least partially defining an outside surface of the computer, the outside surface comprising a plurality of holes;

first and second enclosure panels, each adapted to engage the outside surface of the computer;

wherein, when the first and second enclosure panels are engaged with the top and bottom surfaces of the computer, the first and second enclosure panels contact one another along the left and right surfaces of the computer to form a shell assembly that substantially covers the top, bottom, left and right surfaces of the computer;

a pedestal channel comprising a first upright surface having at least one recess therein; and wherein the shell assembly comprises a protrusion on at least one of a top and bottom outside surface thereof for engaging the recess in the first upright surface of the pedestal channel such that the shell assembly is retained when placed on a side in the pedestal channel.

6. The system of claim 5, wherein:

the shell assembly further comprises a tab on at least one of a front and back outside surface for engaging a corresponding recess in a second upright surface of the pedestal channel.

* * * * *